United States Patent [19]

McAllister et al.

[11] 4,023,479
[45] May 17, 1977

[54] TWINE WRAPPER WITH SPRING SUPPLEMENT FOR ROUND BALES

[75] Inventors: Ronald L. McAllister; John H. Freimuth, both of New Holland, Pa.

[73] Assignee: Sperry Rand Corporation, New Holland, Pa.

[22] Filed: June 17, 1976

[21] Appl. No.: 697,286

[52] U.S. Cl. .................................. 100/5; 100/88
[51] Int. Cl.² ................................ B65B 13/18
[58] Field of Search ............ 100/5, 13, 88; 56/341, 56/342, 343

[56] References Cited

UNITED STATES PATENTS

| | | | |
|---|---|---|---|
| 2,850,964 | 9/1958 | Harrer | 100/88 X |
| 3,064,556 | 11/1962 | Luebben | 100/5 |
| 3,910,178 | 10/1975 | Eggers et al. | 100/5 |
| 3,988,977 | 11/1976 | Anderson | 100/88 |

*Primary Examiner*—Peter Feldman
*Attorney, Agent, or Firm*—C. Hercus Just; Frank A. Seemar; John R. Flanagan

[57] ABSTRACT

Apparatus on a round bale forming machine for wrapping a strand of binding twine around a round bale of crop material prior to discharging said bale from the machine. Said apparatus includes a strand directing arm pivotally supported upon a fixed member adjacent the forward end of the machine for movement of the outer end of the arm by powered actuating mechanism between opposite sides of the machine to effect a roving of the twine feeding from said outer end of the arm around and between opposite ends of a round bale to place tension upon said twine as fed from said outer end of said arm, and including an auxiliary spring connected to said arm and operable to produce supplemental tensioning force upon said outer end of said arm as the same approaches the outer extremities of the path of movement thereof.

2 Claims, 8 Drawing Figures

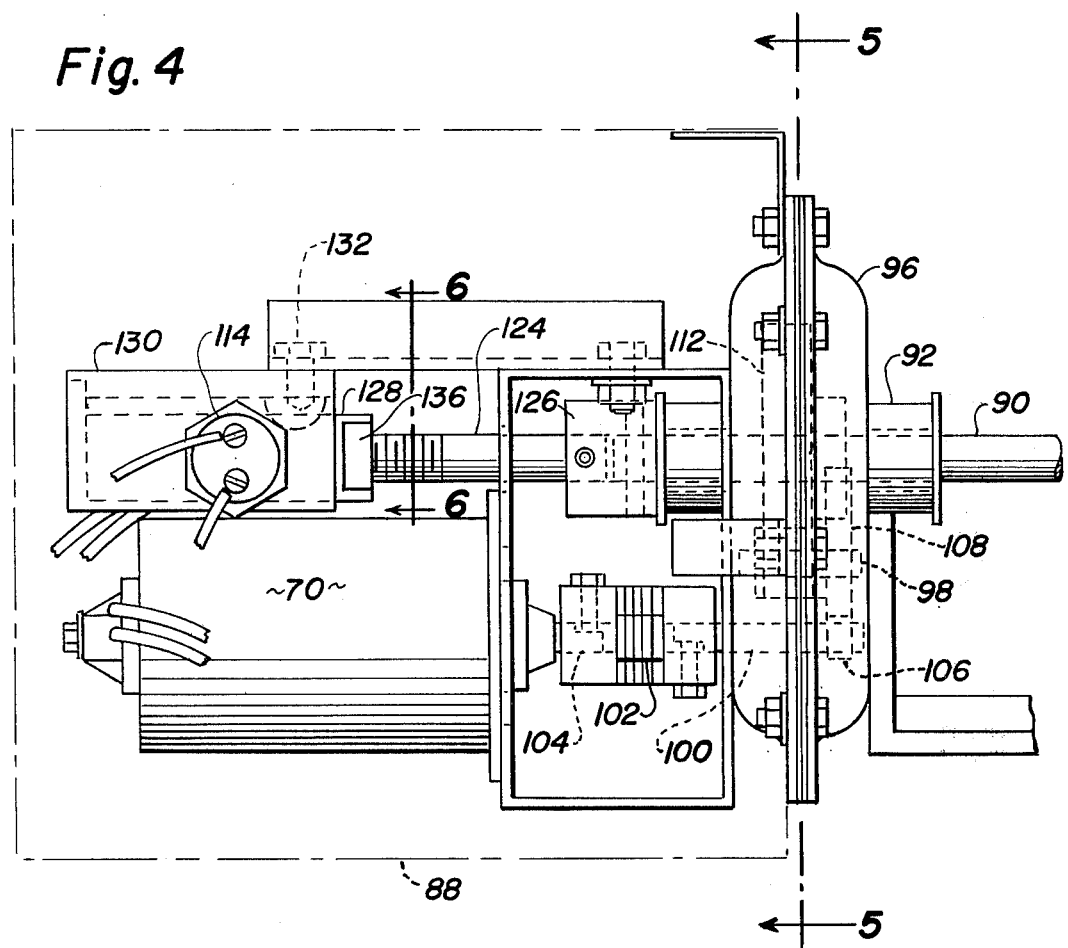
Fig. 4
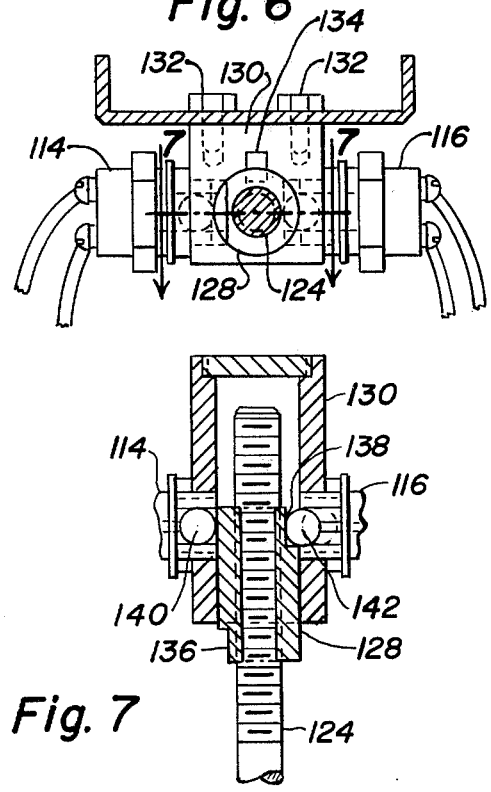
Fig. 6
Fig. 7
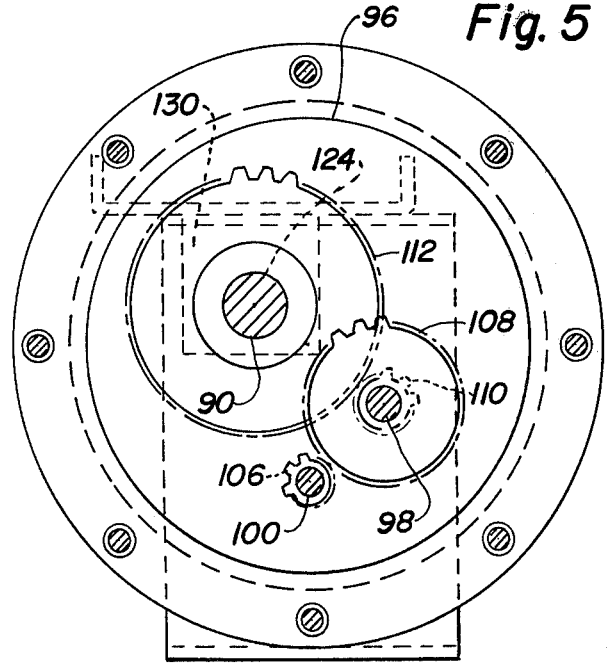
Fig. 5

TWINE WRAPPER WITH SPRING SUPPLEMENT FOR ROUND BALES

REFERENCE TO RELATED APPLICATION

This application is related to U.S. Patent application Ser. No. 697,285, filed on even date herewith in the name of Ronald L. McAllister and entitled: Electrically Operated Twine Wrapper for Round Bales.

BACKGROUND OF THE INVENTION

This invention relates to a machine for forming round bales of forage crops and, more particularly, to apparatus for wrapping a strand of binding twine in coiled fashion around a round bale between the opposite ends thereof, said apparatus having mechanism to effect roving of the binding twine around said bale as the bale is being rotated around a horizontal axis prior to discharging the same from the bale forming machine.

It has been the accepted and customary way to harvest and store forage crops for many years by mowing the crop in the field, permitting it to dry to a reasonable extent, forming it into windrows, and compacting the windrows into rectangular shapes of bales by conventional hay-baling machines of customary type. To store rectangular-type bales, they must either be conveyed to a shed or barn and stacked, or if they are left in the field, they must be covered with waterproof coverings in order to provide means for shedding rain and other types of moisture in order to prevent the bales from rotting.

In recent years, an innovation has occured in the baling art in the form of machine which handles the windrows in a manner to coil the same into a relatively compact roll, usually of very substantial size and weighing many hundreds of pounds such as of the order of between 1000 and 1500 pounds. One of the principal advantages of roll type bales of forage crops is that they may be much more readily stored as well as fed to herbivorous animals simply by letting the rolls lie on one side in a field or feed lot. In this condition, animals may readily feed upon such rolls until they are gradually consumed. In order to stabilize the rolls, it has become accepted practice to coil a strand of binding twine or the like circumferentially around the rolls and extend the same somewhat in spiral manner between opposite ends of the roll.

For purpose of illustrating typical types of machines for forming round bales, attention is directed to U.S. Pat. No. 3,815,345 that discloses a machine that has been highly succesful in the formation of round bales. Also, for purposes of illustrating a typical type of apparatus for disposing a roving type strand of binding twine in spiral manner around a round bale, attention is directed to U.S. Pat. No. 3,910,178, to Eggers et al., and assigned to the assignee of the instant invention. In the latter machine, the application of the binding twine to the roll is at least in part effected manually by an operator sitting, for example, upon the seat of the tractor which propels the round bale forming machine along a field.

In addition to the aforementioned prior art patents, reference is also made to U.S. Pat. No. 3,913,473, to Meiers, dated Oct. 21, 1975 and in which roving of the binding twine is effected by hydrauically-acted mechanism which moves a twine directing arm substantially along a horizontal plane while distributing the twine from the outer end of the arm which moves in an arcuate path between opposite sides of the bale forming machine.

One problem encountered in previously employed devices for applying a substantially spiral type strand of binding twine around a round bale of forage crop materials has been the inability to furnish adequate tension to the twine as it is applied to the bale and particularly to achieve substantially even tension in the twine between opposite ends of the bale. Further, in manually operated twine applying devices, it has been found that when tractors, for example, of substantial horsepower and large size are employed to propel a round bale forming machine along a field, the seat for the operator either is enclosed within a cab or otherwise is sufficiently remote from the bale forming machine that it is difficult or even impossible for the operator to negotiate operation of manually operated means to effect the deployment of the binding twine around a round bale as produced in a round bale forming machine.

OBJECTS AND SUMMARY OF THE PRESENT INVENTION

It is one of the principal objects of the present invention to provide in a bale forming machine which forms round bales apparatus to dispose a strand of binding twine in substantially spiral manner around a round bale of forage crop material by the use of a twine directing arm relative to which an endless supply of said twine moves longitudinally, said arm being pivotally mounted adjacent one end upon the forward portion of said bale forming machine, and motor means of limited power oscillates said arm to dispose the outer end thereof respectively between opposite sides of the bale forming machine while the formed bale is being rotated about horizontal axes within said machine and thereby cause the twine to be extended around said bale spirally due to the roving effect performed by the outer end of said twine directing arm, and associated with said object, it is a special object of the present invention to provide auxiliary tension spring means connected stationarily at one end to said bale forming machine and the opposite end of said spring being connected o said twine directing arm intermediately between the opposite ends thereof.

It is another object of the invention to pivotally support said one end of said twine directing arm adjacent the upper end of an upstanding member carried by the forward portion of the bale forming machine and said stationarily mounted end of said tension spring being connected to said upstanding member at a location radially above the axis of the pivotal mounting for said twine directing arm.

It is a further object of the invention to connect the pivotally mounted end of said twine directing arm upon a disc-like member which is rotatably mounted upon an axis adjacent the upper end of said upstanding member, and include a bracket connected to the upper end of said upstanding member and extending transversely therefrom so as to be offset at the outer end of said bracket from said upstanding member, and said stationary end of said tension spring being connected to the offset end of said bracket so as to provide no interference with the pivotally mounted twine directing arm during normal operation thereof.

Still another object of the invention is to connect the opposite end of said tension spring to said twine directing arm in an adjustable manner longitudinally of said arm by means of a clamp adapted to be adjustably connected to said twine directing arm between the opposite ends thereof in a desired location in which the spring is placed under tension during all positions of said arm during the oscillating movements thereof, whereby said spring affords additional supplemental torque to said arm and thereby permits the use of a driving motor of limited power output such as a electric motor capable of being operated by a storage battery of the type normally carried by agricultural tractors of the type employed to propel bale forming machines of the kind to which the present invention pertains when moved along a field.

Details of the foregoing objects and of the invention, as well as other ojbects thereof, are set forth in the following specification and illustrated in the accompanying drawings comprising a part thereof.

DETAILED DESCRIPTION OF THE DRAWINGS

FIG. 1 is a side elevation, partly in vertical section, taken along line 1—1 of FIG. 2, and illustrating a typical machine for forming round bales and upon which the twine wrapping mechanism comprising the present invention is shown in operative position thereon.

FIG. 2 is a substantially front elevation of the bale forming machine shown in FIG. 1 but illustrated on a larger scale than employed therein, the outer portions of the mobile wheels and the upper portion of said machine being omitted in said figure to adapt it to the sheet, the twine directing arm of the wrapping mechanism being shown in one extreme position in full flines and in the opposite extreme position being illustrated in phantom.

FIG. 4 is a fragmentary, further enlarged side elevation of the driving mechanism for the twine directing arm, said view including the driving motor and speed reduction mechanism as well as the control means for the motor, substantially as viewed on the line 4—4 of FIG. 2.

FIG. 5 is a vertical sectional view of the gear type speed reduction unit which is directly associated with the motor, said view being taken on the line 5—5 of FIG. 4.

FIG. 6 is a fragmentary vertical elevation illustrating details of the limit switch arrangement employed in the control means for the motor of the apparatus, as seen on the line 6—6 of FIG. 4.

FIG. 7 is a horizontal sectional view showing details of the operation of the limit switch unit as seen on the line 7—7 of FIG. 6.

FIG. 8 is a diagrammatic plan view of the limit switch circuit and motor which is mounted on the baling machine and also showing the electric power and control means for the circuit such as carried by the tractor which propels the baling machine and illustrating a diagrammatic quick disconnect provided in said circuit.

DETAILED DESCRIPTION OF THE PREFERRED EMBODIMENTS

Figure 1:
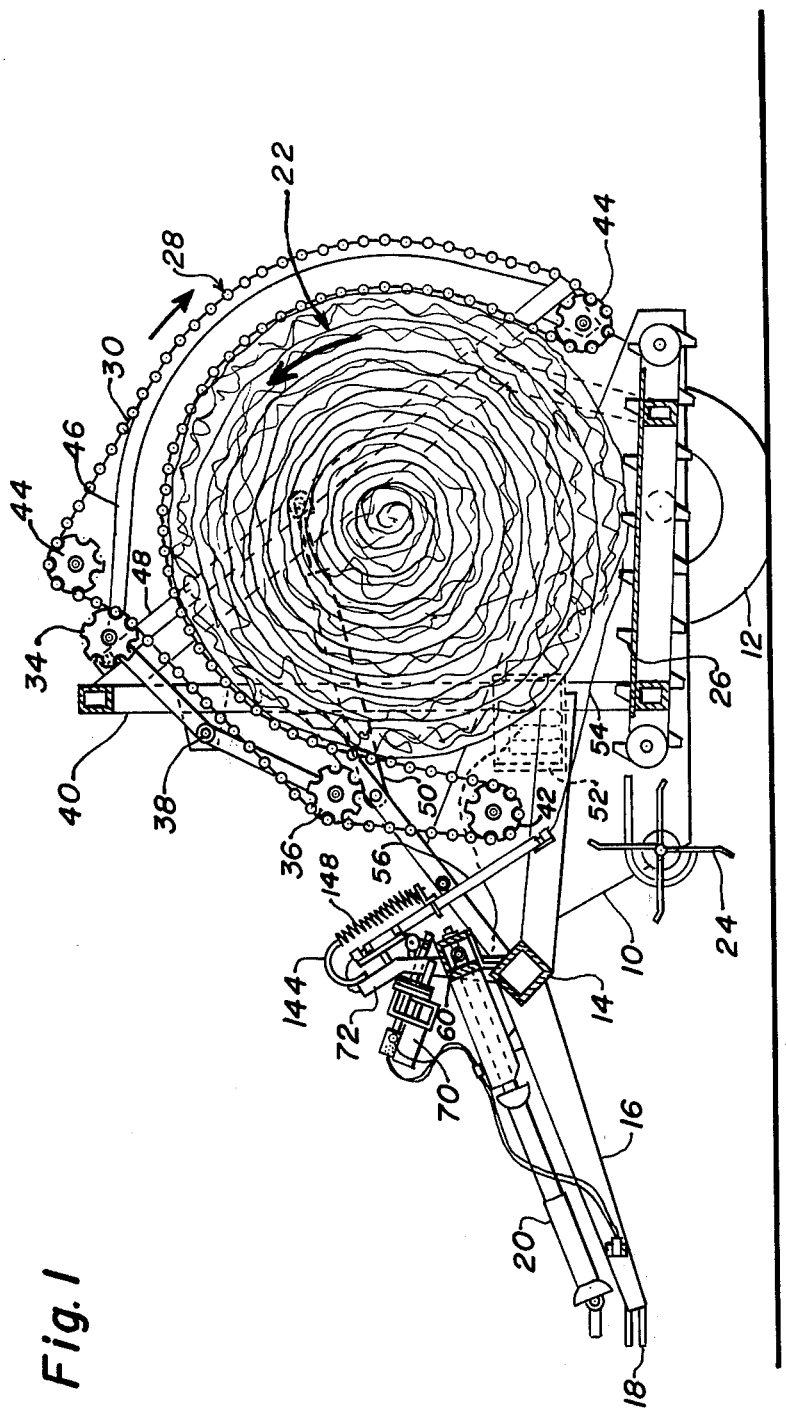

Referring to FIG. 1, the round bale forming machine comprises a sturdy frame 10 which is supported in mobile fashion by a pair of wheels 12 respectively mounted on opposite sides of said frame. The frame 10 also includes a horizontal, transverse front beam 14 from which a tongue 16 projects forwardly for connection by means of a clevis 18 to a tractor, not shown. Illustrated in association with the tongue 16 is a telescoping type drive shaft 20 which is connected at its forward end to a p.t.o. unit of a conventional agricultural tractor of suitable size and power to propel the baling machine along a field for purposes of picking up a swath of dried or semi-dried agricultural crop material such as hay, alfala, clover, or otherwise, and coil it into a roll 22 of such product.

Figure 2:
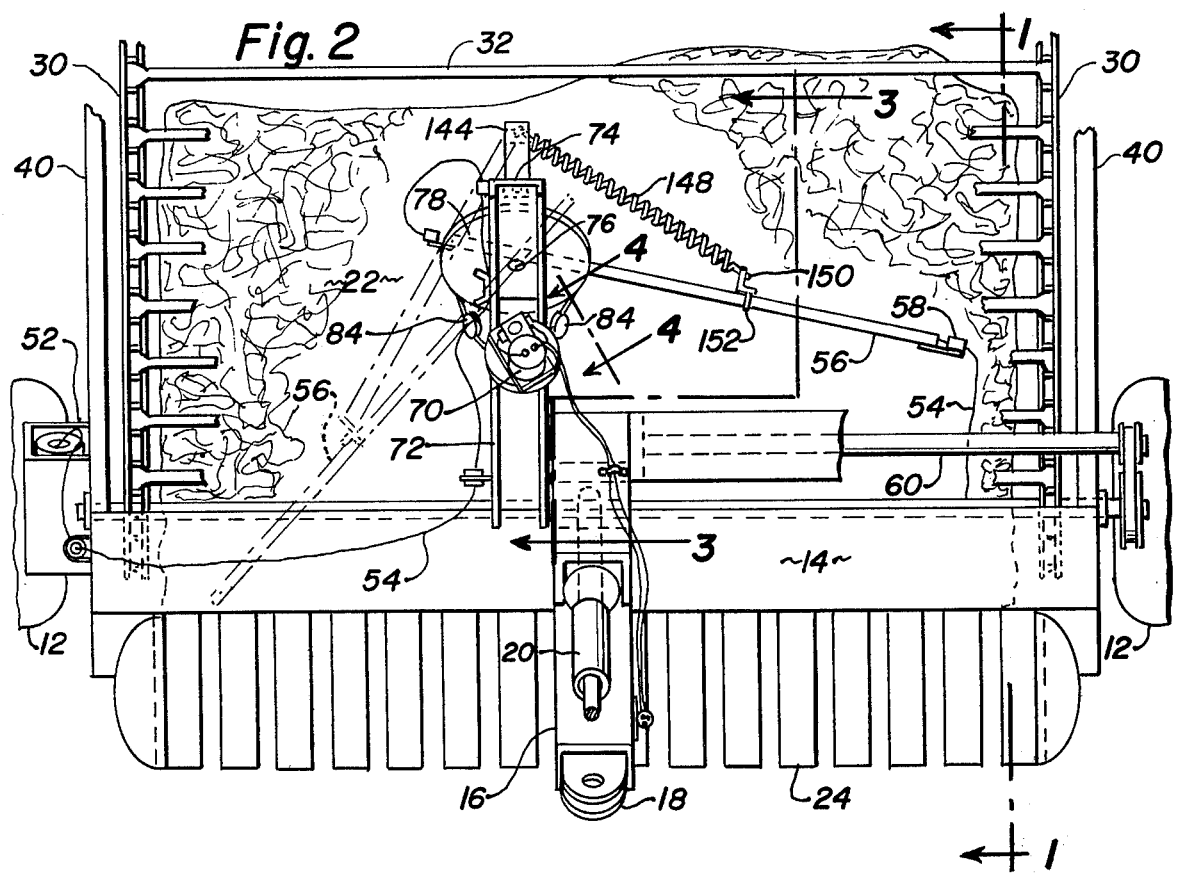

The swath of material is picked up at the forward end of the baling machine by a rotatable pickup means 24 which delivers the swath to the upper flight of a bottom conveyor apron unit 26, the upper flight of which moves rearwardly as shown by the direction arrow in FIG. 1. Said swath is also engaged by an upper endless apron 28 which is of the type illustrated in said aforementioned U.S. Pat. No. 3,910,178 and consists of a pair of enless chains 30 between which a number of similar rigid, horizontal bars 32 extend as shown in FIG. 2, said bars being spaced apart in the direction of movement of the apron 28. Said apron moves in the direction of the arrows shown in FIG. 1, with respect thereto, whereby it will be seen that the innermost portion of the apron 28 is capable of expansion as the roll 22 of crop material expands in diameter. This is accomplished in a manner also described in detail in said aforementioned U.S. Pat. No. 3,910,178, the same being effected by the idler sprockets 34 and 36 being mounted upon arms capable of rotating about a supporting axis 38 which extends between and is supported by a pair of vertical frame members 40 which extend upward from the main frame 10 at opposite sides of the machine as can be seen from FIG. 2. Drive sprockets 42 and additional idler sprockets 44 are supported by curved frame members 46 which are connected at the opposite ends thereof to pivoted frame members 48 which are operated simultaneously by a pair of hydraulic cylinder units 50 when it is desired to discharge the completed roll 22 of crop material which occurs from the rearend of the machine which is at the right hand end as viewed in FIG. 1.

In order that the roll 22 of desired diameter may be stabilized when discharged from the baling machine, said machine is provided with a supply of twine or the like which is arranged in a compact ball stored in twine container 52 . As viewed in FIG. 2, it will be seen that the outer end of the twine 54 extends from the container 52 to the inlet end of a pivotally mounted twine directing arm 56 and is discharged from the outer end 58 thereof as also shown in exemplary manner in FIG. 2. During the formation of the roll 22 of crop material, the outer end of the twine 54 is held loosely substantially in the position shown in FIG. 1 with respect to said roll. Said outer end, under said circumstances, also will be adjacent one end of the roll as can be visualized from FIG. 2 where it will be seen that said outer end of the twine is disposed adjacent the right hand end of the machine as viewed in said figure. No substantial feeding of the twine will occur under such circumstances until it is desired to coil the twine around the completed roll 22 which occurs immediately before discharging the roll from the machine. When the coiling of the twine around the completed roll is to occur, the mechanism comprising the principal object of the present invention then is operated while the roll 22 is continuously rotated about its central horizontal axis through the power derived from drive shaft 22 that is connected to the p.t.o. of the tractor and, by means of suitable gearing, not shown, a drive shaft 60 is rotated to effect operation of various drive shafts connected with the lower and upper aprons 26 and 28 for purposes of actuating the same in the manner also described in detail in said aforementioned U.S. Pat. No. 3,190,178. Such continuous rotation of the roll 22 effects frictional contact with the outer end of the twine 54 in a manner to pull the twine from the twine directing arm 56, pivotal movement for roving operation thereof then being effected by the operator who is seated at that time upon the tractor, not shown. The operator initiates operation of the pivotal movement of the arm 56 by manually operating a switch handle 62, see FIG. 8, connected to a suitable double-throw switch 64, or the equivalent thereof, which is connected in a control circuit 66 shown at the left hand end of the diagrammatic layout in FIG. 8, said circuit continuing through a quick disconnect 68 and extends to an electric motor 70 which furnishes the motive power for oscillating the twine directing arm 56 through apparatus described in detail as follows.

Figure 3:
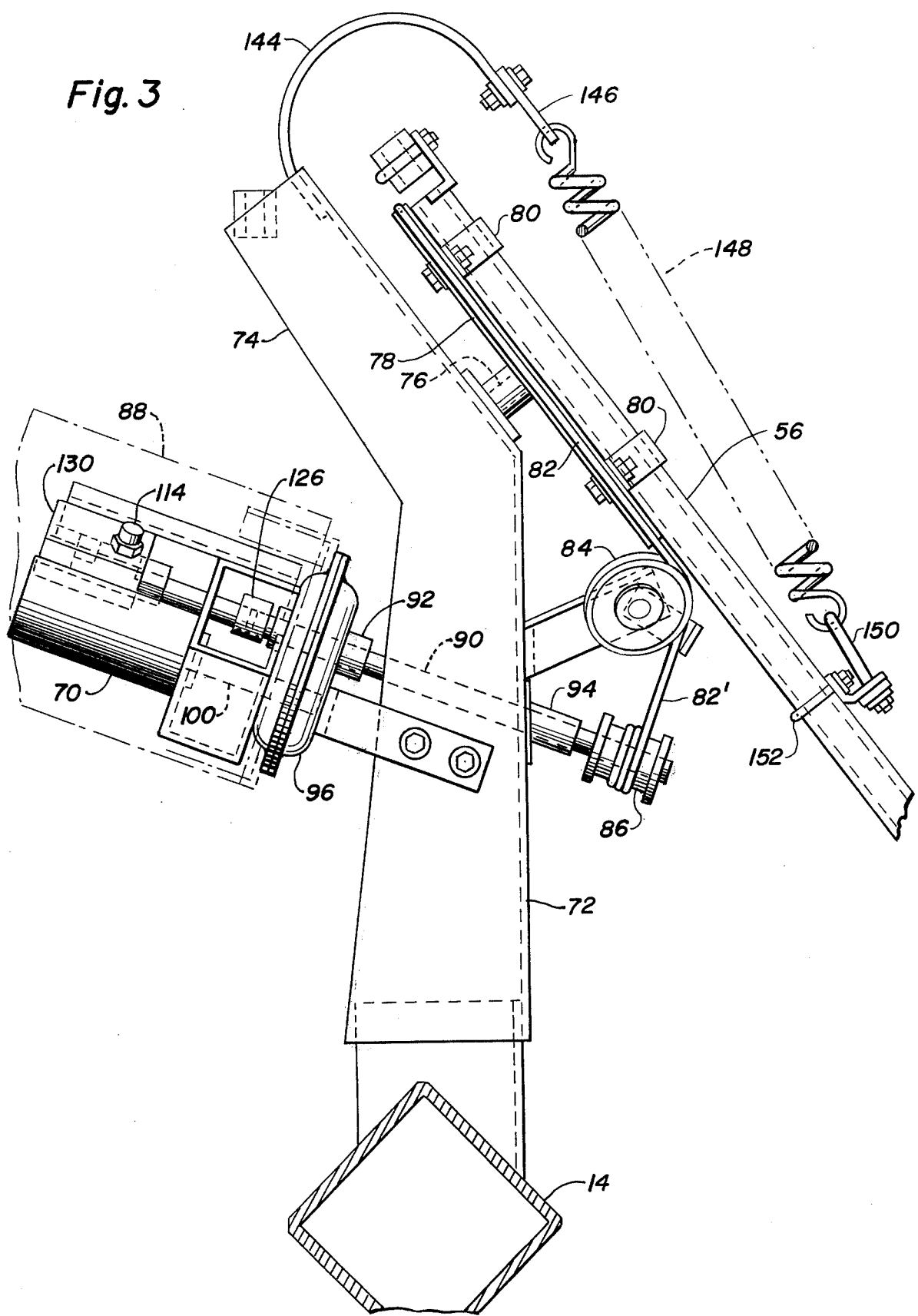
FIG. 3 is a fragmentary, and partially sectioned enlarged view of the wine wrapping mechanism embodying the present invention, substantially as seen on the line 3—3 of FIG. 2.

Supported by the front beam 14 of the bale forming machine is an upstanding member 72 which is best shown in detail in FIG. 3. As will be seen from FIG. 2, the member 72 is substantially midway between the opposite sides of the bale forming machine, but in actuality, is slightly offset from the center due to the fact that the tongue 16 is actually disposed in the center of the machine and the member 72 is immediately adjacent one side thereof. An angular extension 74 is provided for purposes of supporting a short shaft 76 within an appropriate bearing and to which a circular disc 78 is fixedly connected to one end of said short shaft which is supported by said angular extension of said post-like upstanding member 72. Said disc comprising mounting means for the tubular twine directing arm 56. As clearly shown in FIG. 3, a pair of clamping hasps 80 extend around the tube 56 adjacent one end thereof and conventional bolts tightly clamp the tube to the mounting disc 78. The periphery of the disc 78 also is grooved for purposes of receiving an endless, flexible driving cable 82, said cable also engaging a pair of idler pulleys 84, one of which is clearly shown in FIG. 3, said pullys being for purposes of changing the direction of the cable 82 in order that the lower portion 82' may extend for a number of convolutions around a small diameter driving hub 86.

The purpose of the angular offset or extension 74 of the upstanding member 72 is to dispose the supporting disc 78 and twine directing arm 56 with a plane which slopes downward and rearward from the vertical as can best be seen in FIGS. 1 and 3. Considering this in conjunction with the opposite, extreme positions of the outer end 58 of the distributing arm 56 as shown in FIG. 2, it has been found that such an arrangement affords desired efficiency with respect to tensioning the twine 54 as it is spirally extended around the completed roll of crop material 22 due to the roving action of the twine directing arm 56 as it oscillates from one extreme position to the other. From FIG. 2, it also will be seen that the full line extreme position of the arm 56 is closer to the horizontal than the phantom position thereof shown adjacent the left hand side of the machine as seen in FIG. 2. This is due to the offset of the upstanding post member 72, the necessity for which is explained hereinabove.

DRIVE MECHANISM FOR TWINE POSTIONING ARM

As referred to hereinabove, one of the principal purposes of the present invention is to provide drive means for the twine distributing arm 56 capable of being controlled from a relatively remote position with respect to the roll forming machine and particularly under circumstances where, for example, the actuating means for the control unit is mounted in a cab on a tractor or otherwise is positioned in a way where it is either not possible or highly inconvenient to actuate the oscillation of the twine directing arm 56 by such manually operable means disclosed in said aforementioned U.S. Pat. No. 3,910,178. At the present time, most agricultural tractors of modern design include a storage battery, especially for purposes of operating starting mechanisms for the engine of the tractor. Accordingly, it is one aspect of the present invention to employ an electric motor 70 to effect oscillating movement of the directing arm 56. Details of the drive mechanism actuated by the electric motor 70 are as follows.

Attention is primarily directed to FIGS. 3–8 in which details of the drive mechanism are shown in suitable scale to readily comprehend the same. In FIG. 3, it will be seen that diagrammatically illustrated housing 88 encloses the drive mechanism. Two speed reduction units are employed in this mechanism. The first speed reduction unit comprises a circular mounting disc 78 which is of a far greater diameter than the small driving hub 86 around which the lower portion 82' of the cable 82 extends for a limited number of convolutions to provide adequate driving friction between hub 86 and the cable. Hub 86 is driven by drive shaft 90 which extends through bearing 92 and 94. Drive shaft 90 is driven by a gear type speed reduction unit 96 which comprises the second speed reduction unit referred to above. Said unit is enclosed within an appropriate housing and includes, in addition to shaft 90, an idler shaft 98 and a drive shaft 100. The drive shaft 100 is connected by means of a flexible coupling 102 shown in FIG. 4 directly to one end of the motor shaft 104.

Mounted upon shaft 100 is a small diameter, preferably helical spur gear 106 which meshes with a larger diameter gear 108 which has teeth complementary to those on spur gear 106. These meshing gears drive the shaft 98 upon which is mounted another spur gear 110 of relatively small diameter which meshes with a driven gear 112 of much greater diameter than spur gear 110, driven gear 112 being connected to shaft 90. As a result of said gearing, the speed of rotation of shaft 90, which drives the hub 86 is far less than that of the motor shaft 104 and, due to the first mentioned speed reduction unit comprising disc 78 and driving hub 86, the speed of oscillation of the twine directing arm 56 is sufficiently slow that sucessive convolutions of the twine around the round bale 22, especially in relation to the speed of rotation of said bale, are spaced axially apart appropriate distances, such as of the order of 6 or 8 inches to one foot or more, as required in accordance with the type of material and the degree to which the binding of the bale is desired.

The limit of movement of the outer end 58 of the twine directing arm 56 is controlled by suitable electrical means comprising a pair of limit switches 114 and 116 which are connected in the circuit 118 to the motor 70 as shown in FIG. 8. Said circuit is also innerconnected to the control circuit 66 in which the double throw switch 64 is connected by means of the quick disconnect 68. The circuit 66 also includes an energy source such as a storage battery 120 of the type normally embodied in a modern tractor of the size and power capable of propelling the bale forming machine. Said circuit also preferably includes an overload breaker 122. Without describing each individual circuit conductor of the circuits 66 and 118, the paths of which are obvious from FIG. 8, it is believed to be sufficient to state that when the doublethrow type switch handle 62 is thrown in one direction, it will energize the motor 70 to operate in one direction, and in view of the fact that said motor is of the reversible type, when the handle 62 is thrown in the opposite direction, the first circuit is broken and a second circuit is established to cause the motor 70 to operate in the reverse direction to the first one descried. Accordingly, from this, it will be seen that the operation of the twine directing arm is effected to move the outer end thereof from one side of the bale forming machine toward the other when the switch is closed in one direction, whereas a reverse traverse of the arm 56 is effected by closing the switch in the opposite direction. The limit of movement of the outer end of the arm 56 in either direction respectively is controlled by operation of the limit switches 114 and 116.

The limit switches 114 and 116 preferably are of the type having an operating plunger which is spring pressed radially inward toward the axis of screw threaded shaft 124 which is co-axial with and is fixedly connected to drive shaft 90 through an appropriate coupling 126 shown in FIG. 4.

A limit switch actuating member 120 is internally threaded to receive the threaded shaft 124 as is best shown in FIG. 7. The member 128 also is axially movable within a housing 130 which is mounted adjacent the motor 70 and is supported within the housing 88 by an appropriate pair of threaded bolts 132. The actuating member 128, for example, is cylindrical and is slidable within a mating bore in the housing 130. To prevent rotation between the two, a coacting spline and key 134 is provided between the housing and actuating member.

The switch actuating member 120 is provided respectively on opposite ends thereof with recesses or flats 136 and 138. These are provided for purposes of accommodating intermediate actuating members 140 and 142 which specifically comprise hardened balls such as those used in ball bearings which respectively are seated on the inner ends of the switchactuating plungers of limit switches 114 and 116. Hence, when the control switch 64 is closed at one end to actuate the twine directing arm 56 in one direction, the actuating member 128 will be moved axially in one direction until one of the recesses 136 or 138 is disposed opposite one of the balls 140 or 142 which will then drop into the appropriate recess and open that particular limit switch to which it is connected. Conversely, when the twine directing arm 56 is to be moved in the opposite direction, so as to restore the outer end thereof to the initial starting position, at which time the twine is severed, the control switch 64 is closed at the opposite end to interrupt the first circuit and establish a second circuit which will cause the actuating member 128 to move in the opposite axial direction until the other recess 136 or 138 is disposed opposite the other ball 140 or 142, at which time said ball will drop into the recess and open the opposite limit switch 114 or 116 and thereby stop any further movement of the arm 56.

In the preferred operation of applying the binding twine to a completed round bale, the twine directing arm moves from its initial position shown in full lines in FIG. 2 arcuately to the opposite extreme position shown in phantom in said figure and then returns from the latter position to said initial position, at which time the twine is them severed by knife means, not shown. One type of suitable knife means is shown in said aforementioned U.S. Pat, No. 3,190,178 and such knife may be employed in the present invention.

If desired, and in view of the fact that in the preferred operation of the twine directing arm 56, the initial arcuate excursion of the arm 56 moves the outer end 58 thereof from adjacent one side of the machine to the other and then stops such movement by actuation of one of the limit swiches 114 or 116, followed by shifting of the control switch 64 to effect the return excursion to the initial starting position, it is conceivable within the purview of the present invention that twine severing knife means may be mounted respectively adjacent opposite sides of te bale forming machine.

AUXILIARY SPRING TENSION

One of the foremost objectives of the invention is to produce adequate tension upon the outer end 58 of the twine directing arm 56 as said outer end approaches the limit of outward movement respectively toward opposite sides of the machine, whereby substantially uniform tension may be applied to the twine being dispensed from said arm during the entire excursion of the outer end thereof between opposite sides of the bale 22. The preferred mechanism is shown particularly in FIGS. 2 and 3 in which it will be seen that a bracket 144 is attached at one end to the uppermost portion of angular extension 74 of upstanding member 72 as shown in FIG. 3, said bracket being curved to provide an opposite end to which a small anchor plate 146 is connected, the same having an aperture receiving one hooked end of a relatively strong, tension spring 148. The opposite end of said tension spring is connected to an eyebolt 150 which is clamped by means of a U-bolt 152 to the twine directing arm 56 intermediately thereof between the outer end 58 and the pivotal axis of the arm provided by shaft 76. By reason of the fact that the upper, anchored end of spring 148 is spaced vertically above the pivotal axis comprising shaft 76, substantial assisting supplemental force is applied to the distributing arm 56 to move the outer end 58 thereof toward one or the other of its extreme positions respectively adjacent opposite sides of the machine and thereby provides additional torque to said arm for purposes of supplementing the drive force of the motor under conditions where twine 58 is being wrapped around the outer end portions of the round bale 22.

From FIG. 3, it also will be seen that the curved arrangement of bracket 144 disposes the spring 148 out of any conflict with the movement of the pivoted end of arm 56 and the supporting disc 78. Also, in the preferred arrangement, spring 148 is under tension in all positions of the arm 56 and particularly as the arm 56 approaches its opposite extreme positions between the sides of the machine. Further, the tension provided by spring 148 may be adjusted due to the fact that the U-bolt 152 may be firmly clamped to the arm 56 at any desired location longitudinally along the arm, whereby the added torque furnished to arm 56 by spring 148 may be varied, as desired.

Further, from FIG. 2, it will be seen that as the outer end of arm 56 is moved toward the extreme, adjacent the right hand side of the machine, the arm will be closer to the horizontal than when it is in the extreme left hand position shown in phantom in FIG. 2. Therefore, it is in regard to movement of the outer end of the arm 56 toward the right hand position viewed in FIG. 2 that the added torque afforded by spring 148 is most needed and during such movement of the arm to the right hand extreme position, the spring 148 will progressively be contracted but the added torque afforded by the spring under such circumstances is fully adequate to supplement the driving force provided by motor 70 and thereby prevents placing any undue burden upon the motor, whereby a motor of only limited horsepower may be used and particularly a motor which is capable of being energized by a storage battery such as one normally provided in a tractor of the type which propels the bale forming machine which embodies the present invention along a field.

The foregoing description illustrates preferred embodiments of the invention. However, the concepts employed may, based upon such description, be employed in other embodiments without departing from the scope of the invention. Accordingly, the following claims are intended to protect the invention broadly, as well as in the specific forms shown herein.

We claim:

1. A bale forming machine for forming round bales and wrapping binding twine around the bales prior to discharging them from the machine and comprising;
   a. a mobile frame having a forward end adapted to be connected to and propelled by a tractor over a swath of crop material,
   b. means on said frame to form a round bale by coiling said swath about a horizontal axis, and discharging a formed round bale from said frame,
   c. means on said frame to supply a continuous strand of binding twine,
   d. upstanding means adjacent the forward end of said frame,
   e. a twine directing arm adapted to receive twine from said supply means and pivotally connected adjacent one end thereof to the upper portion of said upstanding means for discharge of twine from the opposite outer end of said arm, and
   f. power means interconnected to the pivoted end of said arm and operable to oscillate said outer end of said arm through an arc downwardly and upwardly between opposite sides of said frame to effect winding and roving of the twine around a round bale spirally between the opposite ends of said bale and impose tension upon said twine during said winding and roving thereof; in combination with:
   g. auxiliary tension spring means, connected at one end to said upstanding means on said frame and the opposite end of said spring being connected to said arm intermediately thereof between the outer end and the pivotal axis and operable to supplement the tensioning effect produced by said power means upon said arm by providing added torque to the outer end of said arm especially when the same is moving through the outermost portions of the arcuate path of movement thereof,
   h. a support member pivotally connected to said upstanding means, means connecting said one end of said twine directing arm to said support member, and said one end of said tension spring being connected to said upstanding means radially above the periphery of said support member,
   i. a bracket connected to the upper end of said upstanding means radially beyond said support member and having a portion offset laterally toward a bale in said machine beyond the lane of said support member, and means connecting said one end of said spring to said offset portion of said bracket to effect clearance for said twine directing arm relative to said spring.

2. The bale forming machine according to claim 1 in which a clamp is connected in longitudinally adjustable manner to said twine directing arm intermediately between the ends thereof, and said opposite end of said spring being connected to said adjustable clamp to permit varying the tension of said spring.

* * * * *